United States Patent
Takata et al.

Patent Number: 5,258,245
Date of Patent: Nov. 2, 1993

[54] LITHIUM RECHARGEABLE BATTERY AND METHOD OF MAKING THE SAME

[75] Inventors: Kenichi Takata, Hirakata; Nobuharu Koshiba, Nara; Atsushi Ohtsuka; Tatsuo Mori, both of Hirakata, all of Japan

[73] Assignee: Matsushita Electric Industrial Co., Ltd., Osaka, Japan

[21] Appl. No.: 904,847

[22] Filed: Jun. 26, 1992

[30] Foreign Application Priority Data

Jun. 28, 1991 [JP] Japan .................. 3-158207

[51] Int. Cl.$^5$ .................. H01M 4/48
[52] U.S. Cl. .................. 429/218; 423/592
[58] Field of Search .................. 429/194, 218; 423/592

[56] References Cited

U.S. PATENT DOCUMENTS 4,874,680 10/1989 Koshiba et al. .................. 429/197
5,015,547 5/1991 Koshiba et al. .................. 429/194
5,187,033 2/1993 Koshiba .................. 429/194

FOREIGN PATENT DOCUMENTS 57-141869 9/1982 Japan .

*Primary Examiner*—Stephen Kalafut
*Attorney, Agent, or Firm*—Ratner & Prestia

[57] ABSTRACT

The subject invention is a lithium battery comprising a positive electrode mainly of vanadium pentoxide, a negative electrode mainly of lithium doped niobium pentoxide, and, an electrolyte mainly of an anhydrous solvent with dissolved lithium salt. By using for the said niobium pentoxide a mixture of T type and H type crystals heat treated at 850° to 1300° C., preferably 850° to 1100° C., a lithium battery having superior charging cycle characteristics and also having high discharge voltage is obtained.

6 Claims, 3 Drawing Sheets

LITHIUM RECHARGEABLE BATTERY AND METHOD OF MAKING THE SAME

BACKGROUND OF THE INVENTION

The subject invention is related to a rechargeable lithium battery used for mobile power supply, backup memory power supply, etc, and method of making same.

Due to the rapid technological development in the field of electronics in recent years, miniaturization of electronic devices have progressed, and as the power supply for such devices the demand for small, light weight, batteries having high energy density has been rising. As such a battery, the lithium battery using lithium as the negative electrode has received attention and research is being conducted world-wide. However, when metallic lithium was used for the negative electrode, through repeated charging and discharging, the lithium has become drawn out or branch-type crystals called lithium dendrites have formed on the surface of the lithium negative electrode to damage the shape of the lithium negative electrode, and, the charging cycle life was extremely short. And, this would finally cause the lithium falling off the negative electrode to penetrate through the separator and even cause internal shorting in the battery.

As one measure of resolving this problem, the use of lithium-aluminum alloy for the negative electrode is proposed in U.S. Pat. No. 4,874,680. Also, the use of a lead alloy with absorbed lithium as the negative electrode is proposed in the Japanese Opened-to-the-Public Patent Application SHO 57-141869. Furthermore, the superiority of niobium pentoxide as a compounding material with lithium for preventing the breakout of lithium dendrites is disclosed in U.S. Pat. No. 5,015,547.

In general, niobium pentoxide has different crystal types depending on its heat treatment temperature. At a heat treatment temperature of 500° C. or less, the crystal type generally called T type is obtained; at heat treatment temperature of 700° to 850° C. the generally called T type; at heat treatment temperature of 850° to 1100° C. a mixture of T type and H type is obtained; at 1100° C. or above the crystal type called the H type is obtained.

Yet, when niobium pentoxide is used as the negative electrode, it is not yet clear how the electrode characteristics change depending on the crystal types.

SUMMARY OF THE INVENTION

The subject invention gives attention to the crystal types of the niobium pentoxide negative electrode material in lithium batteries using vanadium pentoxide as the positive electrode and lithium doped niobium pentoxide for the negative electrode. Its main object is to provide, through study of the heat treatment conditions, a lithium battery with superior charging cycle life and discharging voltage, and, a method of making preferred negative electrodes for the same.

Also, another object of the invention is to improve the characteristics of the lithium battery disclosed in U.S. Pat. No. 5,015,547 utilizing vanadium pentoxide at the positive electrode and lithium doped niobium pentoxide as the negative electrode.

In order to accomplish the said objectives, the subject inventors found through various studies that the optimum heat treatment temperature for the niobium pentoxide used for the negative electrode was from 850° C. to 1300° C.; preferably 850° C. to 1100°.

That is to say, expressed in terms of crystal types, H type (representative peak values for the X-Ray diffraction images corresponding to the niobium pentoxide's crystal types: 3.73 Å, 3.64 Å, 3.48 Å) to a mixed region of H and T type (representative peak values: 3.93 Å, 3.15 Å, 3.09 Å, 2.46 Å, and, 3.74 Å, 3.64 Å and 3.48 Å) were excellent; in particular, it was found that a mixture of H and T type provided excellent balance between the discharging voltage and the charging cycle characteristics.

Other objects of the subject invention, other than the said objects, and details shall be made clear with embodiments to be explained along with the following figures.

DETAILED DESCRIPTION OF THE INVENTION

Figure 2:
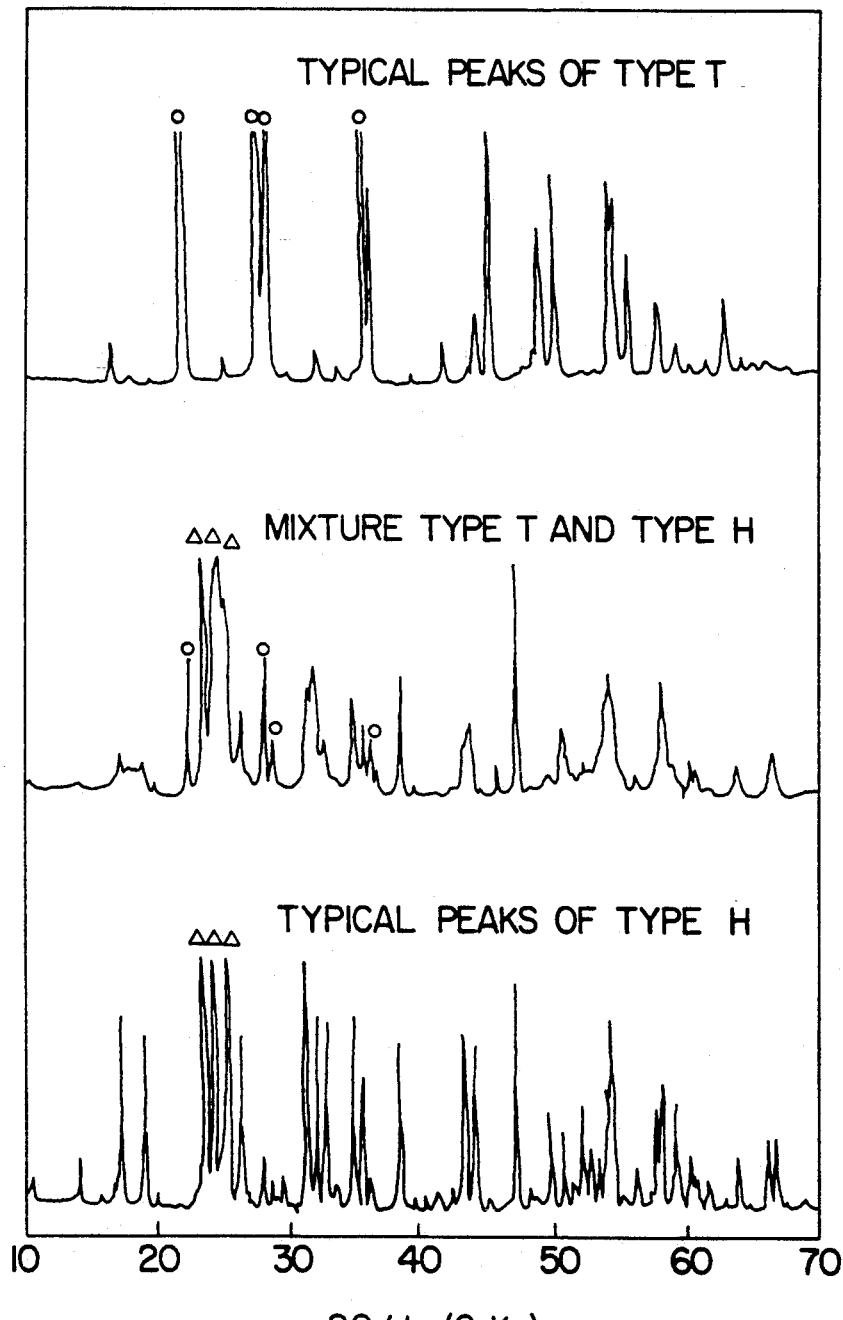
FIG. 2 is a X-Ray diffraction figure for niobium pentoxide for different heat treatment temperatures.

Generally, niobium pentoxide is prepared through heat treatment of niobium hydroxide, and its crystal types differ according to the heat treatment temperature. If heat treated for approximately 3 hours at a temperature of 700° to 800° C., the T type crystals are formed. At temperatures of 1150° C. and above, the H type crystals, and at temperatures between 850° and 1100° C., a mixture of T type and H type are formed respectively. FIG. 2 shows the X-Ray diffraction figures obtained from the niobium pentoxide crystal types and corresponding X-Ray diffraction, while Table 1 shows the respective representative peak values.

TABLE 1

| Heat Treatment Temperature | Crystal Type | Representative Peak Values for X-Ray Diffraction Images Corresponding to Niobium Pentoxide Crystal Types |
|---|---|---|
| 700° C. 750° 800° C. | T Type | 3.93 Å, 3.15 Å 3.09 Å, 2.46 Å |
| 850° C. 900° C. 1000° C. 1050° C. 1100° C. | Mixed T & H Types | 3.93 Å, 3.15 Å 3.09 Å, 2.46 Å, 3.74 Å, 3.64 Å, 3.48 Å, |
| 1150° C. 1200° C. 1250° C. 1300° C. | H Type | 3.74 Å, 3.64 Å, 3.48 Å. |

For the mixed crystal types of the H type and the T type, the crystal peaks for the H and T types can literally be detected simultaneously. It is estimated that this is not merely a mixing of the H and T type crystals, but mixed crystals exist within the same particle.

The inventors have found, after various studies, with regard to the heat treatment temperature that as the heat treatment temperature was increased, that is to say, as the H type became more prominent, that the voltage tended to increase; that compared to the T type, a mixture of T and H type crystals averaged approximately 0.1V and the H type averaged approximately 0.2V higher. (As the heat treatment temperature increases, the potential of the niobium pentoxide decreases and the battery voltage can be increased.)

On one hand, with respect to the charging cycle life, the above trend does not necessarily apply. A heat treatment temperature of 850° to 1100° C., that is to say a mixture of T type and H type crystals, offers the longest life, and even after 500 charging cycles, a high electrical capacity rate of 60 to 80% of the initial value is maintained.

But, for the H type, it was found that the maintenance rate of electrical capacity was lower than that of the mixture of T type and H type crystals, at around 60% of the initial value.

It was also found that in the T type that the capacity maintenance rate after 500 charging cycles was even lower; being around 50% of the initial value.

In sum, in a mixture of T type and H type crystals with heat treatment conditions of 850° C. to 1100° C., the charging cycle life and discharge voltage were both excellent. With the H type having heat treatment conditions of 1150° C. to 1300° C., although the discharge voltage was higher the electrical capacity maintenance rate during the charging cycles was insufficient.

It is estimated that the reason for change in discharge voltage is that, depending on the crystal type of the niobium pentoxide, the lithium ions passing in and out are subjected to differing energy levels. As to change in charging cycle life, this has not been sufficiently clarified as yet.

Yet it is our estimation that in niobium pentoxide processed at preferred heat treatment conditions, the lattice spacing is just right for lithium ions to pass in and out.

From these factors, when niobium pentoxide is used as the negative electrode, the heat treatment temperature of 850° C. to 1300° C. is effective for both discharge voltage and charging cycle life. In particular as a battery, when the charging cycle characteristics is given weight, 850° C. to 1100° C. is preferred.

We shall now explain in detail using embodiments.

EMBODIMENT

Figure 1:
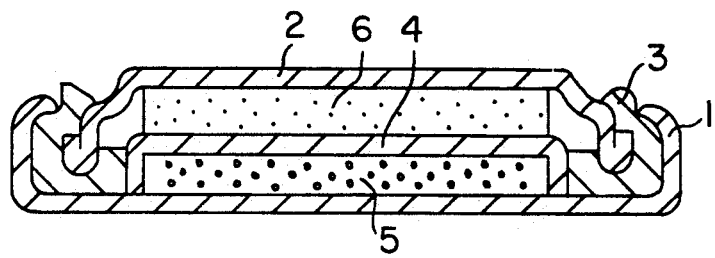
FIG. 1 is a cross-section view of a coin-shaped rechargeable lithium battery according to the subject invention.

FIG. 1 is a cross section view of the lithium battery of the subject invention. In the figure, 1 is the case also serving as the positive terminal, 2 is the sealing panel also serving as the negative terminal, 3 is the polypropylene insulating gasket between the case and the sealing panel, 4 is the separator made from non-woven polypropylene cloth, and 5 is the positive electrode. The positive electrode 5 consists of a blend of 90 parts of vanadium pentoxide powder by weight, 5 parts by weight of carbon black as conductor and 5 parts by weight of a flouroresin as binder, formed into pellets 0.45 mm thick and 12.0 mm in diameter and then dehydrated through high vacuum drying.

6 is the negative electrode, consisting of a blend of 90 parts by weight of niobium pentoxide, 5 parts by weight of carbon black as the conductor and 5 parts by weight of a flouro-resin as the binder, formed into pellets 0.45 mm thick and 12.0 mm in diameter. After dehydrating via high vacuum drying, it was doped in an electrolyte with lithium.

The amount of doping was made to provide the same electrical capacity as that of the niobium pentoxide.

The respective niobium pentoxide samples used were heat treated for a period of 3 hours between 700° C. and 1300° C., using 50° C. increments.

Also, at temperatures above 1300° C. niobium pentoxide began to melt so that electrodes were not formed.

On the other hand, at temperatures of 700° C. or below there are large amounts of impurities, and from trends in preliminary testing, etc., good results were virtually beyond expectations so that actual experiments were not undertaken.

The size of the batteries were approximately 16 mm in outer diameter and approximately 1.6 mm in height.

Figure 3:
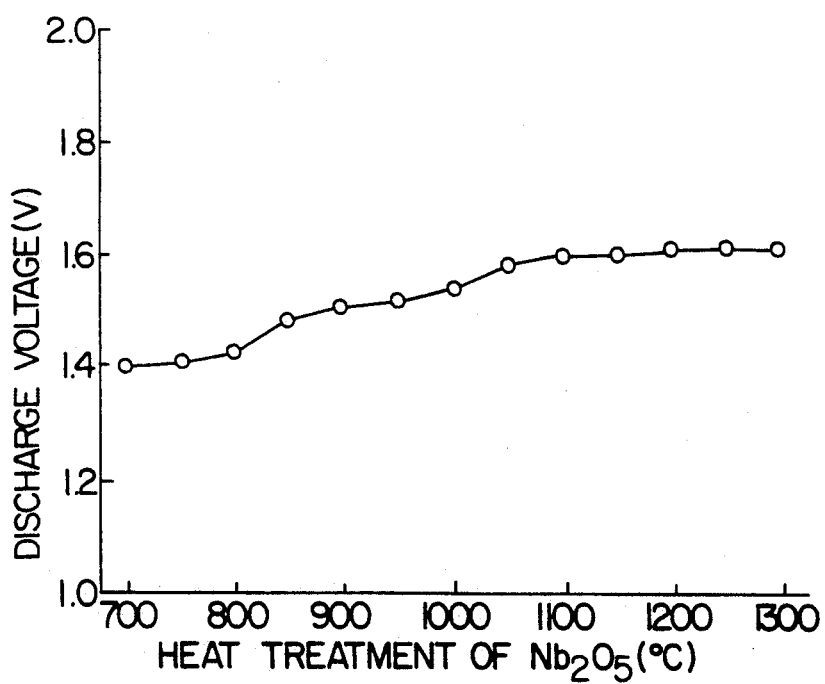
FIG. 3 is a figure showing the average steady discharging voltage for lithium battery when the heat treatment temperature of the niobium pentoxide used for the negative electrode is changed.
Figure 4:
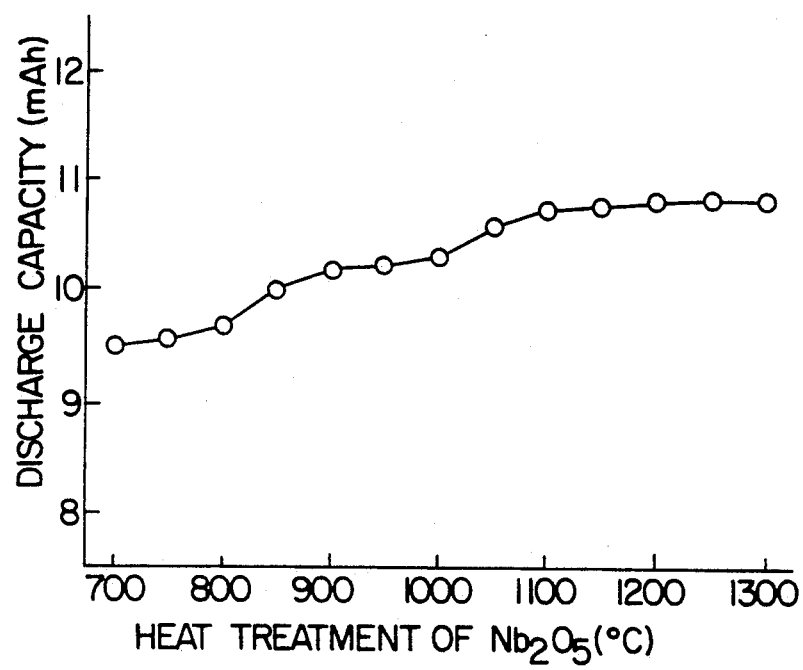
FIG. 4 is a figure showing its discharge capacity.

Discharge tests were conducted at ambient temperature using a 2000 Ohm fixed resistive load. The average maintained discharge voltage until reaching 1.0V and electrical capacity are shown in FIG. 3 and FIG. 4, respectively.

Next, the charging cycle life tests were carried out at ambient temperature under the following conditions:

The charging conditions were: 2 mA constant current, 6 hours charging time, charging cutoff voltage 2.4V.

The discharging conditions were; 2 mA constant current, 6 hours discharging time, discharging cutoff voltage 1.0V.

FIG. 4 shows the capacity retention rate after 500 cycles.

As it is clear from FIG. 3 and FIG. 4, as the heat treatment temperature rises the average maintained discharge voltage rises and the discharge capacity also increases. In comparison to the T type formed at a heat treatment temperature of 700° to 850° C., the T type and H type mixed crystals formed at heat treatment temperature of 850° to 1100° C., the average steady discharge voltage is approximately 0.1V higher and discharge capacity is approximately 0.5 mAh higher. And, for the H type formed at a temperature of 1150° C. or higher, the average steady discharge voltage is approximately 0.2V higher and the discharge capacity is approximately 1 mAh higher.

Figure 5:
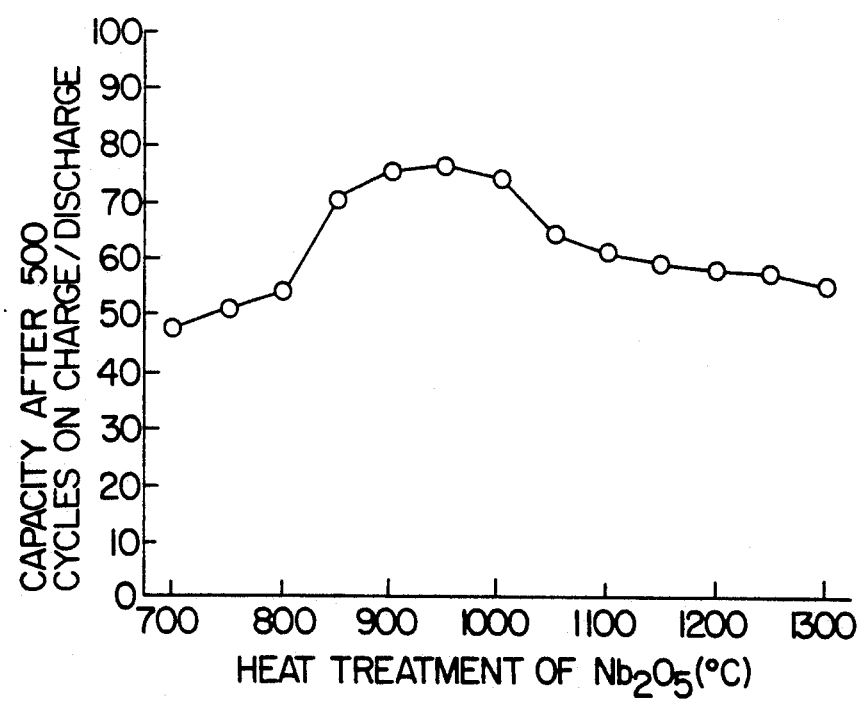
FIG. 5 is a figure showing the electrical capacity maintenance rate for same following 500 charging cycles.

However, the rate of electrical capacity retention, as shown in FIG. 5, showed the highest values for the mixed crystals of T and H types formed at 850° to 1100° C.; being 70 to 80% of the initial values.

While in this embodiment, vanadium pentoxide was used for the positive electrode, roughly the same results were obtained when manganese dioxide containing lithium, cobalt dioxide containing lithium and nickel dioxide containing lithium were used instead.

EFFECT OF THE INVENTION

As it is clear from the above explanation of an embodiment of the subject invention's lithium battery and method for making the same, the use as the negative electrode material a mixture of T type and H type crystal niobium pentoxide heat treated at 850° to 1300° C., preferably between 850° and 1100° C., and doped with lithium, provides a lithium battery with superior charging cycle characteristics and also high discharging voltage.

What is claimed is:

1. A lithium rechargeable battery, in its charged state and comprising a positive electrode, a negative electrode consisting primarily of lithium doped niobium pentoxide and an electrolyte consisting primarily of an anhydrous solvent with dissolved lithium salt, wherein said negative electrode has X-ray diffraction image peak valves corresponding to niobium pentoxide crystals, when using copper (Cu) as the target of at least 3.74 Å, 3.64 Å and 3.48 Å (respectively ±0.05 Å); and where the strength ratio of the said X-ray diffraction image peak values are 3.74 Å:3.64 Å:3.48 Å=90±20:100:90±20.

2. A lithium rechargeable battery in claim 1, wherein the positive electrode is composed primarily of one of a group of vanadium pentoxide, manganese dioxide containing lithium, cobalt dioxide containing lithium, and nickel oxide containing lithium.

3. A lithium rechargeable battery, in its charged state and comprising a positive electrode, a negative electrode consisting primarily of lithium doped niobium pentoxide and an electrolyte consisting primarily of an anhydrous solvent with dissolved lithium salt, wherein said negative electrode has X-ray diffraction image peak values, when using copper (Cu) as the target, corresponding to niobium pentoxide crystals, of at least 3.93 Å, 3.74 Å, 3.64 Å, 3.48 Å, 3.15 Å, 3.09 Å and 2.46 Å (each ±0.05), and peak values of the X-ray diffraction images in the ratio of 3.74 Å:3.64 Å:3.48 Å = 90 ± 20:100:90 ± 20,
3.93 Å:3.15 Å:3.09 Å:2.46 Å = 90 ± 20:±00:40 ± 20:40 ± 20.

4. A lithium rechargeable battery in claim 3, wherein the positive electrode is comprised mainly of one of a group consisting of vanadium pentoxide, manganese dioxide containing lithium, cobalt dioxide containing lithium, and, nickel oxide containing lithium.

5. Method of making a lithium rechargeable battery consisting, in the charged state; and a positive electrode, a negative electrode composed mainly of lithium doped niobium pentoxide and an electrolyte composed mainly of anhydrous solvent with dissolved lithium salt, wherein said niobium pentoxide is heat treated for roughly 3 hours at a temperature from 1150° C. to 1300° C. prior to assembly into said battery.

6. Method of making a lithium rechargeable battery consisting, in the charged state, of a positive electrode, a negative electrode consisting mainly of lithium doped niobium pentoxide and an electrolyte composed mainly of anhydrous solvent with dissolved lithium salt, wherein said niobium pentoxide is heat treated for roughly 3 hours at a temperature from 850° C. to 1100° C. prior to assembly into said battery.

* * * * *

UNITED STATES PATENT AND TRADEMARK OFFICE
CERTIFICATE OF CORRECTION

PATENT NO.    : 5,258,245
DATED         : November 2, 1993
INVENTOR(S)   : Takata et al.

It is certified that error appears in the above-identified patent and that said Letters Patent is hereby corrected as shown below:

At column 6, line 5, delete "wherein" and insert --where--.

At column 6, line 11, delete "and" and insert --of--.

Signed and Sealed this

Eleventh Day of October, 1994

Attest:

BRUCE LEHMAN

Attesting Officer         *Commissioner of Patents and Trademarks*